(12) United States Patent
Heo et al.

(10) Patent No.: US 7,254,197 B2
(45) Date of Patent: Aug. 7, 2007

(54) APPARATUS AND METHOD FOR CANCELING INTERFERENCE SIGNALS IN A RECEIVER FOR A PACKET DATA COMMUNICATION SYSTEM

(75) Inventors: Seo-Weon Heo, Seoul (KR); Seong-Woo Ahn, Yongin-si (KR); Sang-Min Bae, Hwaseong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 742 days.

(21) Appl. No.: 10/677,299

(22) Filed: Oct. 3, 2003

(65) Prior Publication Data

US 2004/0184514 A1   Sep. 23, 2004

(30) Foreign Application Priority Data

Oct. 5, 2002   (KR) ............... 10-2002-0060833
Sep. 30, 2003  (KR) ............... 10-2003-0068084

(51) Int. Cl.
*H04B 7/10* (2006.01)
*H04L 1/02* (2006.01)

(52) U.S. Cl. ............... 375/347; 375/346; 455/132; 455/296

(58) Field of Classification Search ............ 375/347, 375/346; 455/132, 296
See application file for complete search history.

(56) References Cited

U.S. PATENT DOCUMENTS 4,057,834 A * 11/1977 Nakagome et al. .... 358/426.12

(Continued)

FOREIGN PATENT DOCUMENTS

EP   967734   12/1999

(Continued)

OTHER PUBLICATIONS

Robles, Roman "Multiuser Detection in 3G Basestations: Theory and Implementation Using MSC8102", Retrieved from the Internet: URL:www.motorolo.com.cn/semiconductors/sndf-2002/ D503-WISD-US_SNDF_ASIA_02.PDF, Dec. 2, 2003.

(Continued)

*Primary Examiner*—David C. Payne
*Assistant Examiner*—Erin M. File
(74) *Attorney, Agent, or Firm*—Roylance, Abrams, Berdo & Goodman, L.L.P.

(57) ABSTRACT

Provided is an apparatus and method for canceling an interference signal in a packet data receiver in which data is transmitted and received over a packet data channel and a packet data control channel. The packet data channel is time-synchronized with the packet data control channel. A buffer temporarily stores a signal on the packet data channel, combined after being received through multiple paths, until the packet data control channel is decoded. An interference cancellation controller analyzes packet data control channel information obtained by decoding the packet data control channel, and outputs an interference cancellation command signal only when it is determined that effective packet data to be received exists in a current time slot. An interference cancellation section receives the packet data channel signal output from the buffer, and cancels an interference signal from the packet data channel signal only when the interference cancellation command signal is received.

13 Claims, 17 Drawing Sheets

U.S. PATENT DOCUMENTS

| | | | | |
|---|---|---|---|---|
| 6,012,161 | A | 1/2000 | Ariyavisitakul et al. | 714/795 |
| 6,018,546 | A | 1/2000 | Rege | 375/208 |
| 6,381,728 | B1 | 4/2002 | Kang | 714/781 |
| 6,430,214 | B1* | 8/2002 | Jalloul et al. | 375/147 |
| 6,570,919 | B1 | 5/2003 | Lee | 375/233 |
| 6,788,733 | B1* | 9/2004 | Whang et al. | 375/148 |
| 2002/0015438 | A1* | 2/2002 | Ishizu et al. | 375/147 |
| 2002/0126745 | A1 | 9/2002 | Prysby et al. | 375/148 |
| 2002/0159507 | A1* | 10/2002 | Flaig et al. | 375/148 |
| 2002/0177432 | A1* | 11/2002 | Casaccia et al. | 455/410 |
| 2003/0022636 | A1* | 1/2003 | Ylitalo et al. | 455/101 |
| 2003/0053524 | A1* | 3/2003 | Dent | 375/148 |
| 2003/0157897 | A1* | 8/2003 | Maeda et al. | 455/67.3 |
| 2004/0028121 | A1* | 2/2004 | Fitton | 375/144 |
| 2004/0202151 | A1* | 10/2004 | Reznik et al. | 370/352 |

FOREIGN PATENT DOCUMENTS

| | | |
|---|---|---|
| EP | 1083695 | 3/2001 |
| EP | 1233536 | 8/2002 |
| WO | 00-70836 | 5/2000 |
| WO | 02-23742 | 3/2002 |
| WO | 0233838 | 4/2003 |

OTHER PUBLICATIONS

I. Ghauri, et al., "Blind Channel Identification and Projection Receiver Determination for Multicode and Multirate Situations in DS-CDMA Systems", *Acoustics, Speech, and Signal Processing, 2001*, vol. 4, pp. 7-11 (May 2001).

J.H. Horng, et al., "Capacity Enhancement of HSDPA in W-CDMA System", *Vehicular Technology Conference, 2002*, vol. 2, 24-28, pp. 661-665 (Sep. 2002).

Roman Robles, "Multiuser Detection in 3G Basestations: Theory and Implementation Using MSC8102", *Motorola Document Classification*, pp. 1-41 (May 2002).

\* cited by examiner

APPARATUS AND METHOD FOR CANCELING INTERFERENCE SIGNALS IN A RECEIVER FOR A PACKET DATA COMMUNICATION SYSTEM

PRIORITY

This application claims priority under 35 U.S.C. § 119 to an application entitled "Apparatus and Method for Canceling Interference Signals in a Receiver for a Packet Data Communication System" filed in the Korean Intellectual Property Office on Oct. 5, 2002 and Sep. 30, 2003 and assigned Serial Nos. 2002-60833 and 2003-68084, respectively, the contents of which are incorporated herein by reference.

BACKGROUND OF THE INVENTION

1. Field of the Invention

The present invention relates generally to a packet data communication system, and in particular, to an apparatus and method for canceling interference signals at low power in a receiver for a Code Division Multiple Access (CDMA) First Evolution Data and Voice (1x EVDV) communication system, which is a high-speed packet data communication system.

2. Description of the Related Art

Generally, in a CDMA x EVDO communication system, a transmitter uses a quadrature phase shift keying (QPSK) scheme as a modulation scheme for voice signal channels, and transmits signals at a power high enough to overcome a channel error through power control. A receiver combines multipath signals through a rake receiver to increase a signal-to-noise ratio (SNR). However, a high-speed packet data transmission scheme for a CDMA 1x EVDV communication system has evolved into a scheme of adaptively selecting a modulation scheme and a code rate (a ratio of information signals to parity signals) of a channel code according to a channel condition without power control. That is, in the CDMA 1x EVDV communication system, when a mobile station is located close to a base station and has a good channel condition, it transmits signals by using a high-order modulation scheme (e.g., 16-ary quadrature amplitude modulation (16-QAM)) having a high code rate. However, when the mobile station is located far from the base station and has a poor channel condition, it transmits signals by using a low-order modulation scheme (e.g., QPSK) having a low code rate. When the low-order modulation scheme is used, the amount of transmittable information for each frequency band is limited disadvantageously, whereas power of transmission signals advantageously do not need to be high. In contrast, when the high-order modulation scheme is used, the amount of transmittable information for each frequency band is increased advantageously, whereas disadvantageously power of transmission signals must be high. In addition, when the higher-order modulation scheme is used, a signal-to-noise ratio must be higher for satisfactory reception of signals compared to when the existing QPSK modulation scheme is used. For performance improvement of a receiver, it is necessary to remove an interference signal between a unit of chip signals, which was not a big issue in the existing system.

FIG. 1 is a graph illustrating an example of channels used in a CDMA 1x EVDV communication system. The CDMA 1x EVDV communication system employs an adaptive modulation and coding (AMC) scheme and a hybrid automatic retransmission request (HARQ) scheme for high-speed data transmission. There are several possible combinations of modulation schemes, coding schemes and retransmissions, so a packet data control channel (PDCCH) is assigned in addition to a packet data channel (PDCH) in order to transmit information on the possible combinations to a receiver. Referring to FIG. 1, the two channels are time-synchronized with each other and transmitted by the predetermined time (1.25, 2.5, or 5 ms). Therefore, for reception of packet data, a packet data control channel must first be demodulated and channel-decoded to acquire its information, and for this period of time, a packet data signal must be stored in a buffer.

FIG. 2 is a block diagram illustrating an example of a structure of a forward packet data channel (F-PDCH) transmitter in a CDMA 1x EVDV communication system.

An operation of the F-PDCH transmitter will be described in brief with reference to FIG. 2. Data received over the PDCH comprises a packet having a predetermined size. Cyclic redundancy check (CRC) bits are added to the input data packet in a CRC adder 201. An output of the CRC adder 201 is channel-coded (turbo-coded, here) in a tail bit adder 202 and a turbo encoder 203. The purpose of channel coding is to add redundancy to information so that the information becomes robust against an error. The resulting information is larger in size compared with the original information packet. The channel-coded packet is called an "encoded packet." The encoded packet is channel-interleaved in a channel interleaver 204. The channel interleaving reduces the affect of consecutive errors in terms of time. An output of the channel interleaver 204 is scrambled by an adder 205 and a scrambling pattern generator 206. The scrambling prevents an input signal from having a particular pattern. The scrambled signal is transmitted after being modulated through a subpacket selector 207, a QPSK/8-PSK/16-QAM symbol mapper 208, a symbol demultiplexer (DEMUX) 209, first to $N^{th}$ Walsh coverers 210, and a Walsh unit of chip signal adder 211.

FIG. 3 is a block diagram illustrating an example of a general packet data receiver in a CDMA 1x EVDV communication system.

An operation of the packet data receiver will be described in brief with reference to FIG. 3. In a finger section 300, a received signal is multiplied by a pseudo-random noise (PN) code and thereafter, the result is multiplied by Walsh codes for corresponding channels to restore modulation symbol information for respective fingers. Outputs of the respective fingers are combined in combiners 301 and 304 in order to combine multipath signals. In a deinterleaver 302 and a Viterbi decoder 303, control information for receiving packet data is calculated from an output of the combiner 301, and for this time period, a packet data signal generated through the combiner 304 and a parallel-to-serial (P/S) converter 305 is stored in a buffer 306. The packet data information stored in the buffer 306 is decoded through a metric generator 307, a deinterleaver 308 and a turbo decoder 309 according to packet data reception control information.

FIG. 4 is a graph illustrating an example of a relationship between a symbol error rate (SER) and a signal-to-noise ratio (SNR) according to modulation schemes. In the graph of FIG. 4, a horizontal axis represents SNR per bit when there is no channel coder. SNR per modulation symbol rather than bit is higher than this.

Referring to FIG. 4, for a fixed symbol error rate, as the modulation scheme has a higher order (i.e., as M is increased), a necessary SNR becomes higher, relatively increasing the influence of an interference signal. That is, when a low-order modulation scheme is used, the influence of an interference signal is disguised by a previous noise signal, so the influence is not significant. However, when a higher-order modulation scheme is used, the influence of a noise signal is relatively decreased, so the influence of the noise signal is relatively significant.

FIG. 5 is a graph illustrating an example of deterioration of a SNR due to multipath signal interference. Specifically, FIG. 5 is a graph illustrating how a signal-to-noise ratio changes when in a dual-path channel model, an interference signal with an amplitude of 1 is applied to one path and an amplitude of an interference signal of the other path is adjusted from 0.1 to 1. In FIG. 5, Ior/Ioc represents a ratio of signals received from a desired base station to signals received from all the other base stations, and SNR refers to a received signal-to-noise ratio for which even an interference signal due to multipath was considered. As illustrated in FIG. 5, when an interference signal from the other base station has a high level (i.e., Ior/Ioc is low), although amplitude of a multipath interference signal is increased, variations in SNR is not so significant. However, when an interference signal from the other base station has a low level, as the amplitude of a multipath interference signal is increased, SNR is converged into a considerably low value.

A scheme for removing such an interference signal is roughly classified into a scheme using a channel equalizer and a scheme using a serial interference canceller (SIC) and a parallel interference canceller (PIC).

FIG. 6 is a block diagram illustrating an example of a general linear channel equalizer used in a receiver for a packet data communication system.

An operation of the linear channel equalizer will be described with reference to FIG. 6. An equalizer finger 601 filters a received signal, and a multiplier 602 multiplies an output of the equalizer filter 601 by a PN code. An accumulator comprised of an adder 603 and a delay 604 periodically accumulates an output of the multiplier 602 to generate an estimation value of a pilot signal, under the assumption that a Walsh code of the pilot signal is 0, i.e., a DC signal. When another code is assigned, the corresponding code is multiplied before being accumulated. A filter coefficient of the equalizer filter 601 is updated according to a difference between the estimation value and an actual value. In a similar manner, the output of the equalizer filter 601 is applied to a multiplier 605 where it is multiplied by a PN code, and an output of the multiplier 605 is applied to a multiplier 606 where it is multiplied by a Walsh code corresponding to the channel. Further, an output of the multiplier 606 is applied to an accumulator comprised of an adder 607 and a delay 608, where it is accumulated at stated periods. Through such a process, an actual estimation value of packet data is calculated.

FIG. 7 is a block diagram illustrating an example of a general parallel interference canceller used in a receiver for a packet data communication system.

An operation of the parallel interference canceller will be described with reference to FIG. 7. A received signal is applied to a rake filter 701 where it is filtered, and an output of the rake filter 701 is applied to a decision block 702 where a provisional decision is made on corresponding data. A PIC 703 generates an estimated interference signal according to the provisional decision value, and subtracts the estimated interference signal from an original signal to thereby remove an interference signal to some extent. When the provisional decision value has no error and an interference signal is compensated with a known channel characteristic, the interference signal can be completely removed at once. However, since the two conditions cannot be simultaneously satisfied, an interference signal is not completely removed at once. An interference signal is completely cancelled through repetition of the above process by a decision block 704, a PIC 709 and a decision block 710.

The above interference cancellers assume that they receive an intact output of an analog-to-digital (A/D) converter, and there is no system designed to provide an effective structure by connecting the interference cancellers to a characteristic of a high-speed packet data channel. A structure for arranging the interference cancellers in a front section of a receiver without considering a characteristic of a high-speed packet data channel has several problems. Among others, the largest problem in a mobile station is that the interference canceller should always operate, thus increasing power consumption of the mobile station. A channel equalizer comprises a large number of multipliers, and a parallel interference canceller also needs a large number of multiplications. Since the high-speed packet data channel is constructed in such a manner that one channel is shared by several users, the number of time slots actually assigned to one mobile station may not be large. However, since the mobile station cannot determine whether desired packet information is carried on a given time slot before receiving the time slot and the interference cancellers are arranged in a front section of the receiver, the interference cancellers must always be turned on, causing a reduction in life span of a battery mounted on the mobile station. For example, in an extreme case, if the conventional interference canceling scheme is used, even though there is no packet being transmitted to a given mobile station, the interference canceller continuously performs unnecessary operations, wasting the battery power of the mobile station.

SUMMARY OF THE INVENTION

It is, therefore, an object of the present invention to provide an interference cancellation apparatus and method capable of improving reception performance of a receiver in a packet data communication system.

It is another object of the present invention to provide an interference cancellation apparatus and method capable of minimizing power consumption of a mobile station in a packet data communication system.

In accordance with one aspect of the present invention, there is provided an apparatus for canceling an interference signal in a packet data receiver for a packet data communication system in which data is transmitted and received over a packet data channel and a packet data control channel, the packet data channel being time-synchronized with the packet data control channel. The apparatus comprises a buffer for temporarily storing a signal on the packet data channel, combined after being received through multiple paths, until the packet data control channel is decoded; an interference cancellation controller for analyzing packet data control channel information obtained by decoding the packet data control channel, and outputting an interference cancellation command signal when it is determined that effective packet data to be received exists in a current time slot; and an interference cancellation section for receiving the packet data channel signal output from the buffer, and canceling an interference signal from the packet data channel signal when the interference cancellation command signal is received.

In accordance with another aspect of the present invention, there is provided a method for canceling an interference signal in a packet data receiver for a packet data communication system in which data is transmitted and received over a packet data channel and a packet data control channel, the packet data channel being time-synchronized with the packet data control channel. The method comprises the steps of temporarily storing a signal on the packet data channel, combined after being received through multiple paths, until the packet data control channel is decoded; determining whether effective packet data to be received exists in a current time slot, based on packet data control channel information obtained by decoding the packet data control channel; outputting an interference cancellation command signal when the effective packet data to be received exists in the current time slot; and canceling an interference signal from the stored packet data channel signal in response to the interference cancellation command signal.

In accordance with still another aspect of the present invention, there is provided an apparatus for receiving packet data in a packet data communication system in which user data is transmitted and received over a packet data channel and a packet data control channel, the packet data channel being time-synchronized with a packet data control channel. The apparatus comprises a finger for multiplying a multipath signal received over the packet data channel and the packet data control channel by a Walsh code to phase-correct the packet data channel signal, and outputting the packet data control channel signal and the phase-corrected packet data channel signal; a combiner for combining the packet data channel signal output from the finger in a unit of chip; a buffer for temporarily storing a signal output from the combiner until the packet data control channel is completely decoded. The apparatus further comprises an interference cancellation controller for analyzing information on the decoded packet data control channel, and outputting an interference cancellation command signal when it is determined that effective packet data to be received exists in a current time slot; an interference cancellation section for receiving an output signal of the buffer, and canceling an interference signal from the output signal of the buffer when the interference cancellation command signal is received from the interference cancellation controller; and a Walsh decoverer for converting an output signal of the interference cancellation section into a symbol signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
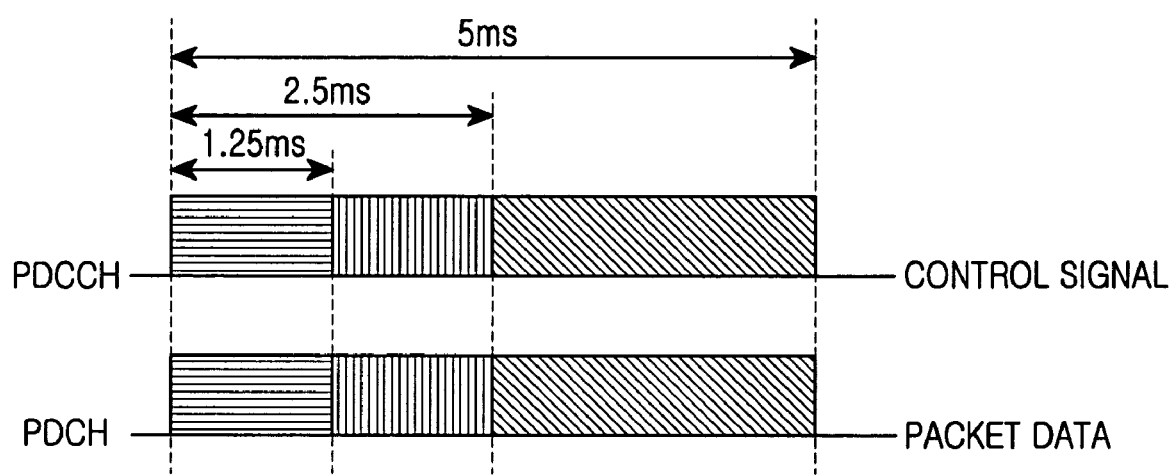
FIG. 1 is a graph illustrating an example of channels used in a Code Division Multiple Access (CDMA) First Evolution Data and Voice (1x EVDV) communication system.
Figure 2:
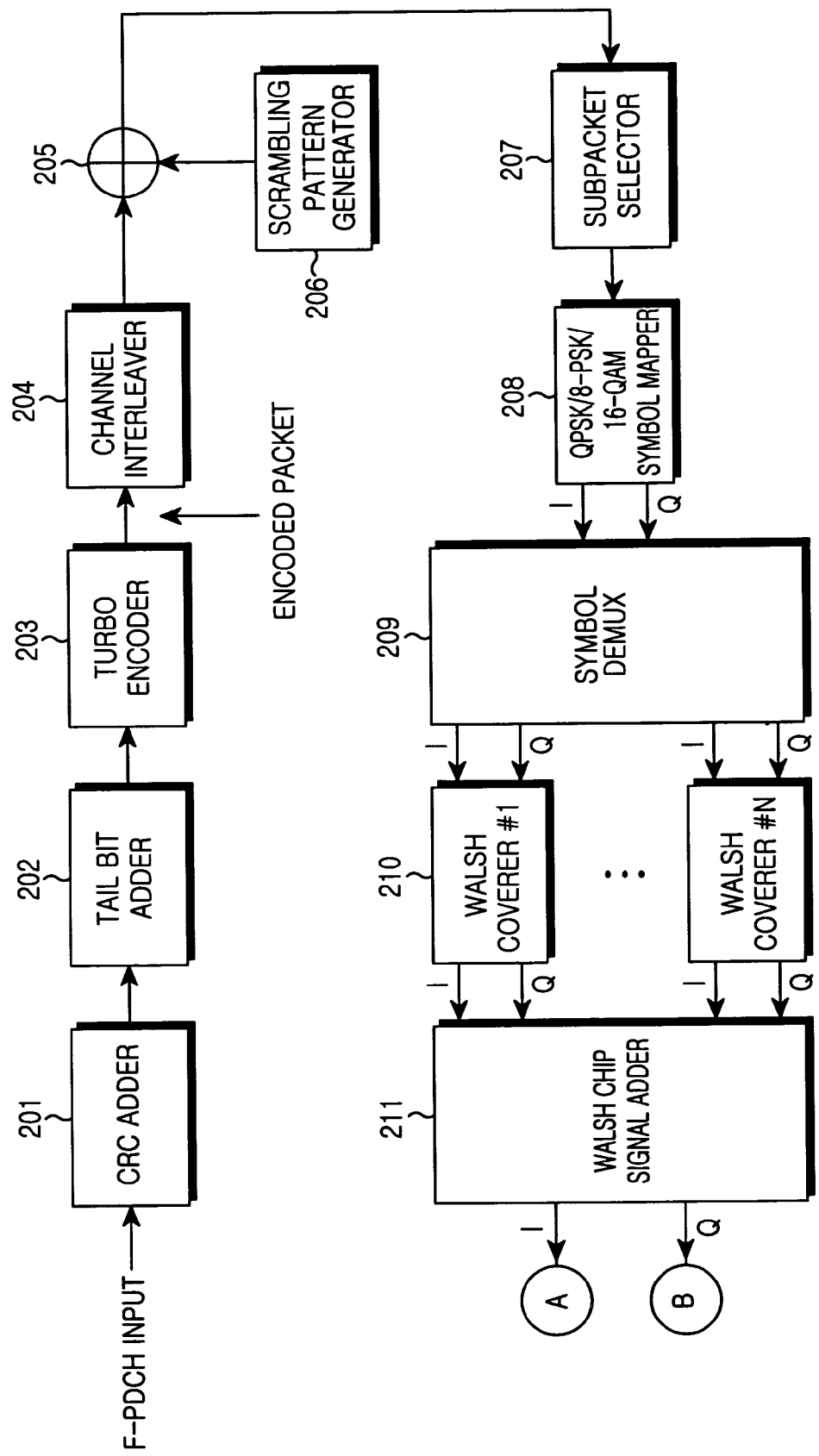
FIG. 2 is a block diagram illustrating an example of a Forward Packet Data Channel (F-PDCH) transmitter in a CDMA 1x EVDV communication system.
Figure 3:
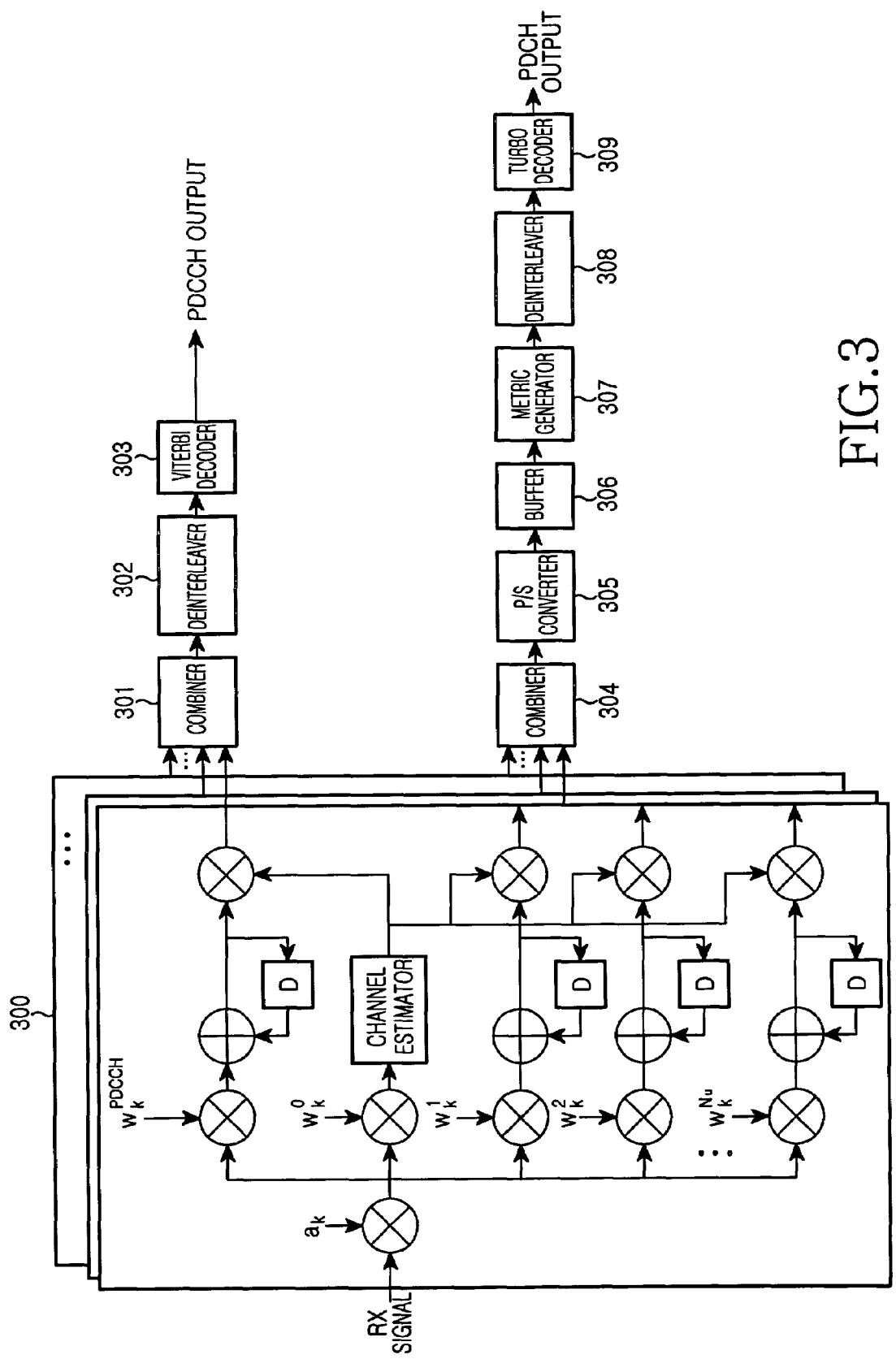
FIG. 3 is a block diagram illustrating an example of a general packet data receiver in a CDMA 1x EVDV communication system.
Figure 4:
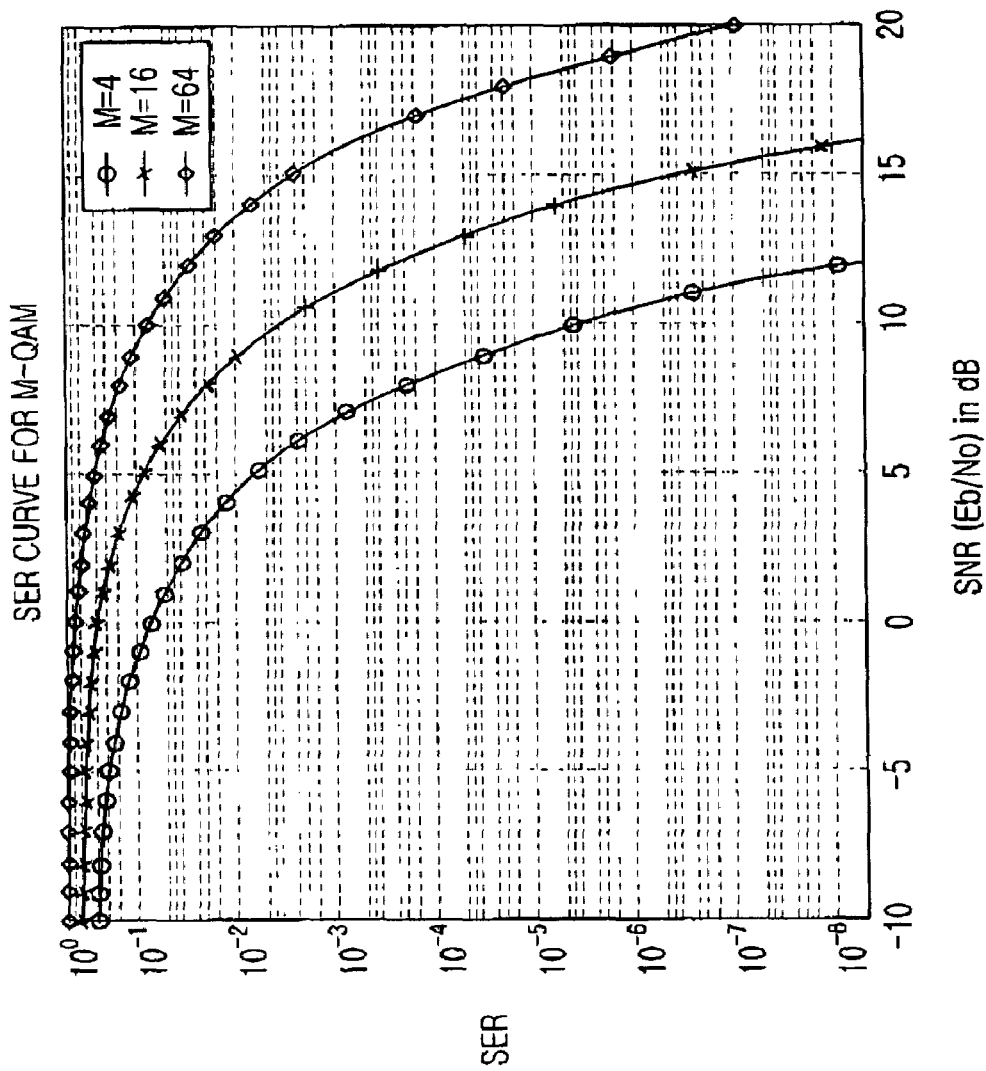
FIG. 4 is a graph illustrating an example of a relationship between a symbol error rate (SER) and a signal-to-noise ratio (SNR) according to modulation schemes.
Figure 5:
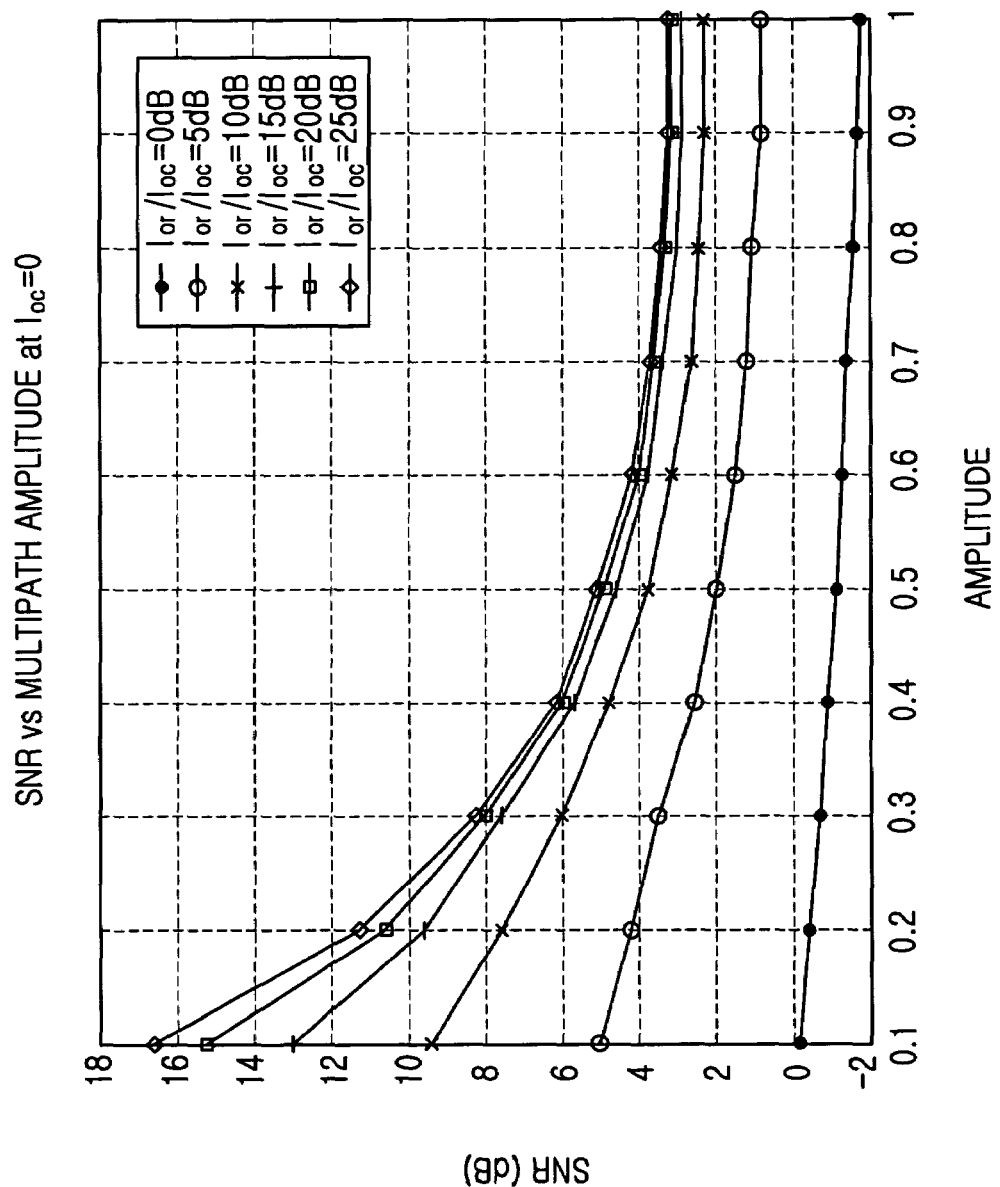
FIG. 5 is a graph illustrating an example of a variation in SNR due to multipath signal interference.
Figure 6:
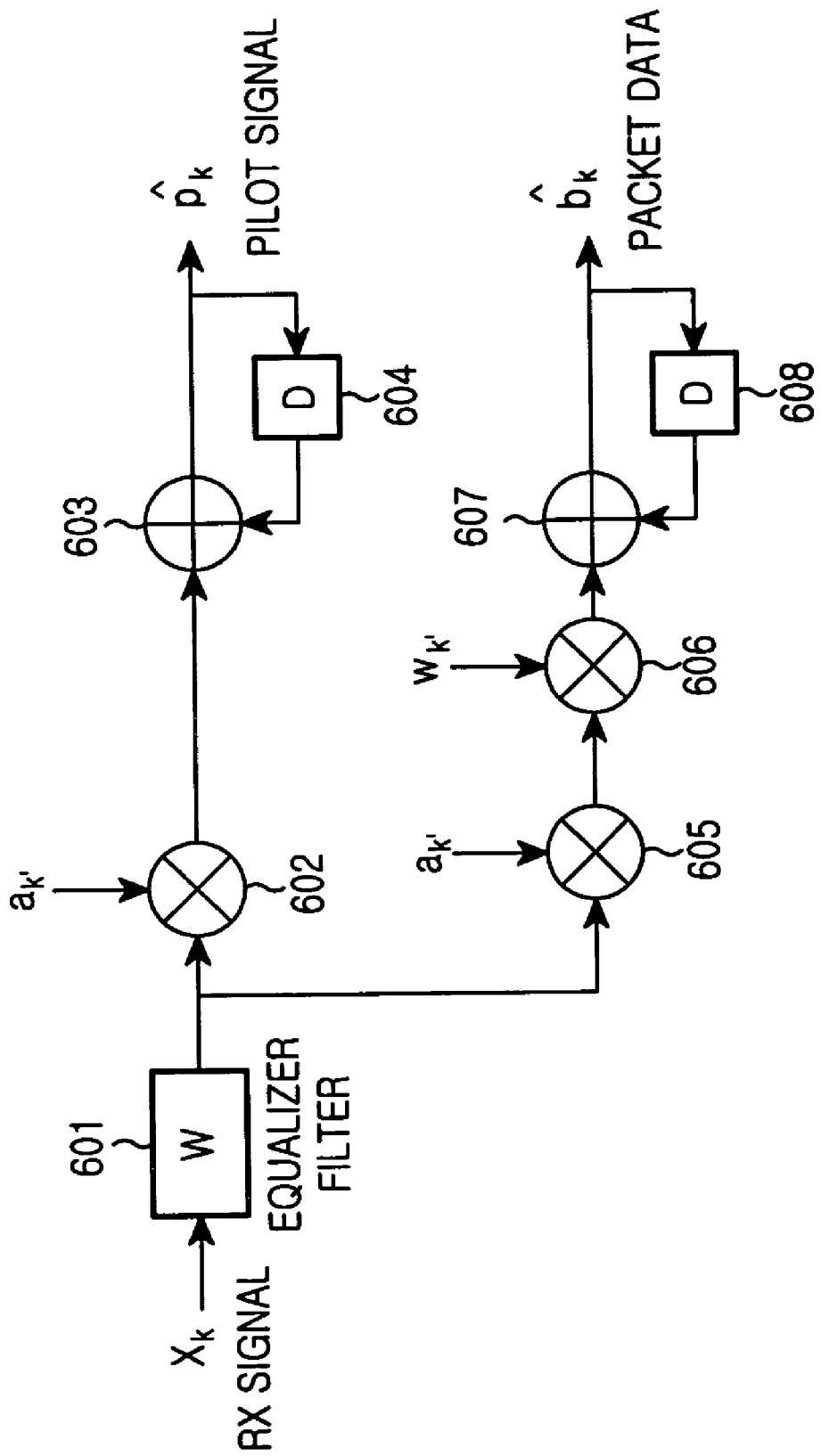
FIG. 6 is a block diagram illustrating an example of a general linear channel equalizer used in a receiver for a packet data communication system.
Figure 7:
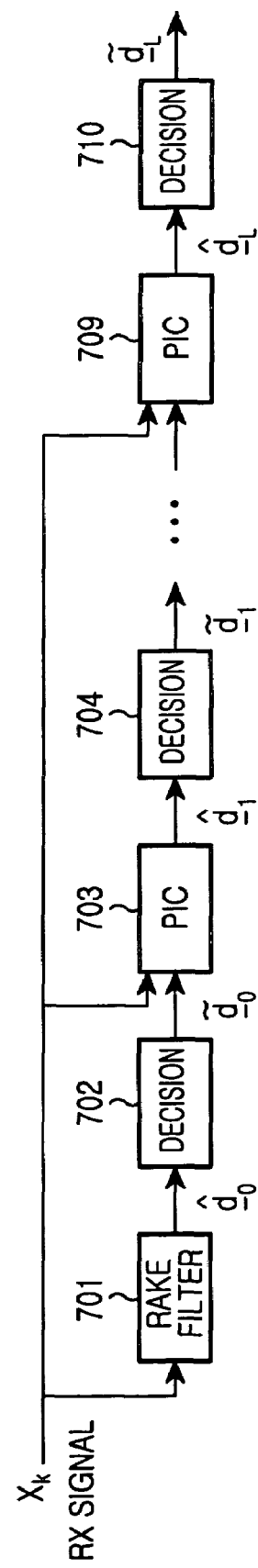
FIG. 7 is a block diagram illustrating an example of a general parallel interference canceller used in a receiver for a packet data communication system.

Several embodiments of the present invention will now be described in detail with reference to the annexed drawings. In the drawings, the same or similar elements are denoted by the same reference numerals. In the following description, a detailed description of known functions and configurations incorporated herein has been omitted for conciseness.

The present invention provides a method for arranging a channel equalizer and an interference canceller such as a serial interference canceller or a parallel interference canceller in a following stage of a packet data channel (PDCH) decode buffer in a receiver for a packet data communication system (or a CDMA 1x EVDV communication system), first decoding a packet data control channel (PDCCH), and then optionally enabling the interference canceller according to the decode result of the packet data control channel and its channel condition. In this manner, the new interference cancellation method reduces power consumption of a receiver as compared with the conventional interference cancellation method.

Figure 8:
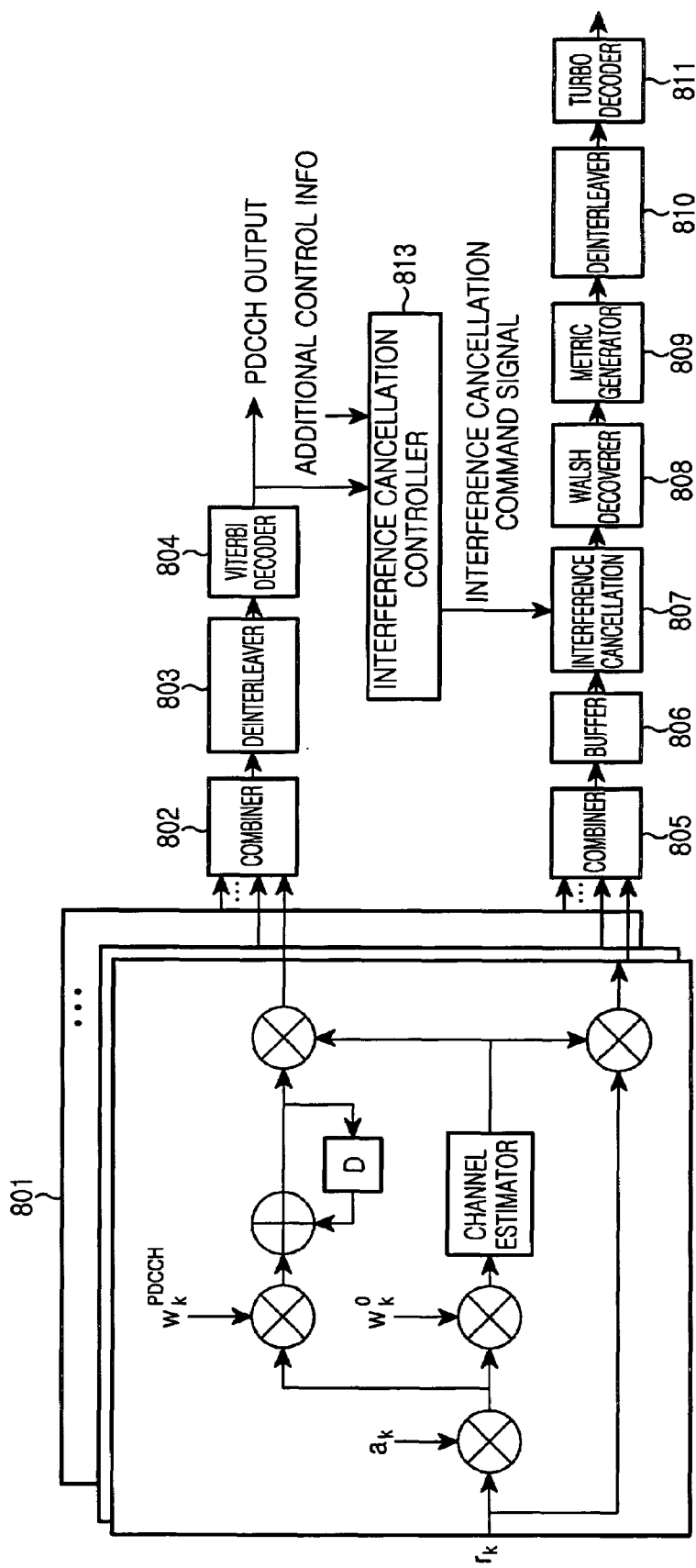
FIG. 8 is a block diagram illustrating an example of a high-speed packet data receiver according to an embodiment of the present invention.

FIG. 8 is a block diagram illustrating an example of a high-speed packet data receiver according to an embodiment of the present invention.

An operation of the high-speed packet data receiver will be described with reference to FIG. 8. A finger section 801 performs processing a received signal. A finger section 801 performs phase correction on a received signal, for combining of multipath signals. The received packet data channel signal is performed phase correction without multiplying the received signal by a PN code, and a combiner 805 combines multipath signals received from the finger section 801. Herein, the multipath signals are combined in a unit of chip signal, unlike the conventional method in which the multipath signals are combined by the symbol signal, and the combined result is stored in a buffer 806. The buffer 806 is necessary for storing packet data while control information needed to process a packet data channel is received.

A packet data control channel signal received from the finger section 801 is decoded through a combiner 802, a deinterleaver 803, and a Viterbi decoder 804. An interference cancellation controller 813 determines whether an interference cancellation operation is necessary, based on packet data control channel information output from the Viterbi decoder 804 and additional control information from hardware or software, and provides an interference cancellation command signal to an interference cancellation section 807, only when necessary. Here, whether to enable the interference cancellation section 807 can be determined by either only the packet data control channel information, or both the packet data control channel information and the additional control information.

The packet data control channel information includes (i) decode error information indicating whether decode was normally performed, (ii) information on a modulation scheme of the packet data channel, extracted from decoding values obtained by decoding the packet data control channel information, and (iii) information on a code rate used in a channel coder. The information on a modulation scheme is information indicating whether the modulation scheme is QPSK, 8-PSK or 16-QAM. It should be obvious to those skilled in the art that it is possible to determine whether to enable the interference cancellation section, even with only one of the information types. Moreover, the additional control information includes information on a multipath signal and information on a channel condition (signal-to-noise ratio Ior/Ioc).

A method for determining whether to enable the interference cancellation section 807 using the additional control information can include a method for enabling the interference cancellation section 807 only for a particular modulation scheme since an influence of an interference signal becomes different according to modulation schemes used; a method for setting a different threshold for Ior/Ioc according to modulation schemes and enabling the interference cancellation section 807 only when the Ior/Ioc is higher than or equal to the set threshold; and a method for enabling the interference cancellation section 807 only when a code rate used in the channel coder is higher than or equal to a particular code rate.

The interference cancellation controller 813 analyzes an output of the packet data control channel to determine whether there is effective packet data to be received at a current time slot, and enables the interference cancellation section 807 only when effective packet data exists in the current time slot. If no effective packet data exists, the interference cancellation controller 813 disables the interference cancellation section 807 to thereby prevent unnecessary power consumption. It should be noted that in actual implementation, the interference cancellation controller 813 can use a more complicated algorithm than the structure stated above. For example, if it is determined that effective packet data exists in the current time slot, the interference cancellation controller 813 compares interference power of a multipath signal with a power ratio Ior/Ioc of a signal from a base station to which a mobile station belongs to a signal from another base station, and enables the interference cancellation section 807 only when an influence of the former is relatively higher. Such implementation can be achieved by separately providing an interference estimator, an Ior/Ioc estimator, and a decision block for determining whether to enable an interference cancellation section according to a particular algorithm based on a modulation scheme. The embodiment of the present invention does not present a standardized form of the above algorithm. Therefore, the embodiment of the present invention can be applied no matter which decision criterion is used in generating a control signal for the interference cancellation section. If it is difficult to measure an interference signal, the interference cancellation controller 813 can be implemented to disable the interference cancellation section 807 when Ior/Ioc is lower than a predetermined threshold. Thus, a gain obtained by removing an interference of a multipath signal is not high. Here, the predetermined threshold can have a different value according to modulation schemes. For example, 16-QAM is generally higher than QPSK in the predetermined threshold.

The interference cancellation section 807 cancels an interference signal using a channel equalizer and a parallel interference canceller (PIC) only when an interference cancellation command signal is received from the interference cancellation controller 813. The interference-cancelled output is Walsh-decovered by a Walsh decoverer 808, so that a unit of chip signal is converted into a symbol signal, and an output of the Walsh decoverer 808 is finally decoded through a metric generator 809, a deinterleaver 810 and a turbo decoder 811.

Instead of symbol-decoding a received signal at a finger stage matched to multipath signals, the high-speed packet data receiver having such a structure directly stores a unit of chip signal in a buffer and decodes a packet data channel using decoded information after decode of a packet data control channel. An example of an interference cancellation section for removing an interference signal from a unit of chip-based packet data signal that is output from the buffer to decode a packet data channel will now be described.

Figure 9A:
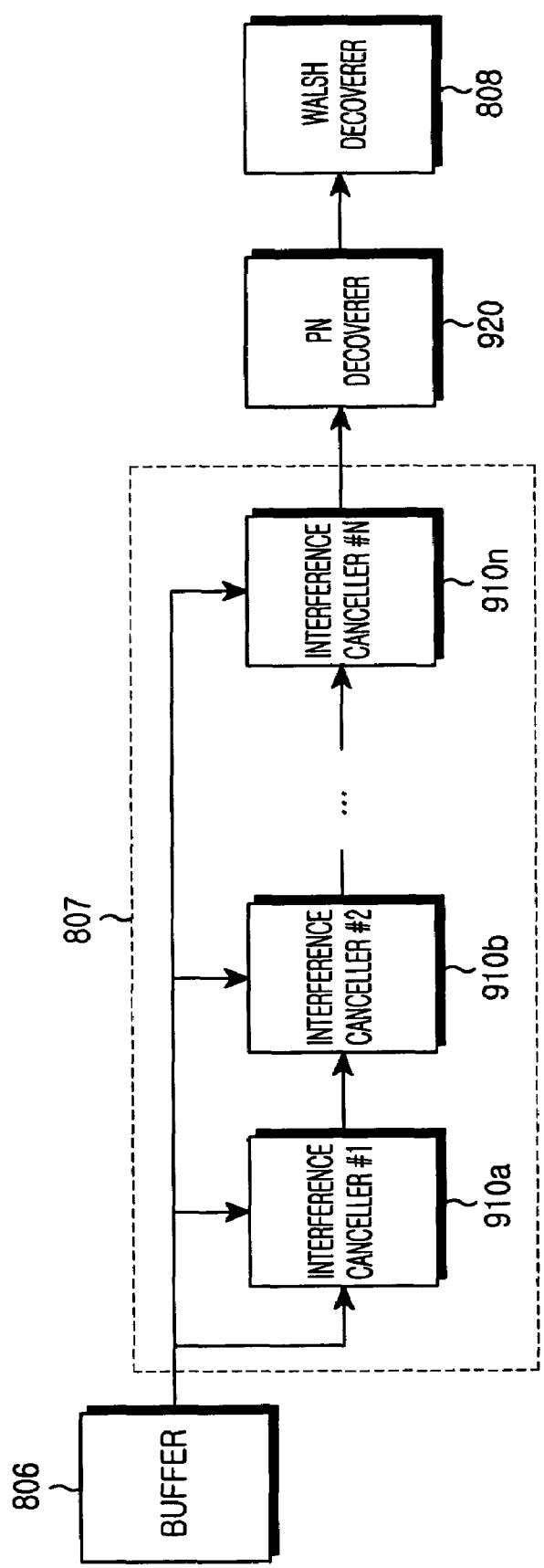
FIGS. 9A and 9B are block diagrams illustrating examples of an interference cancellation section for a high-speed packet data receiver and an interference canceller included in the interference cancellation section according to a first embodiment of the present invention.
Figure 9B:
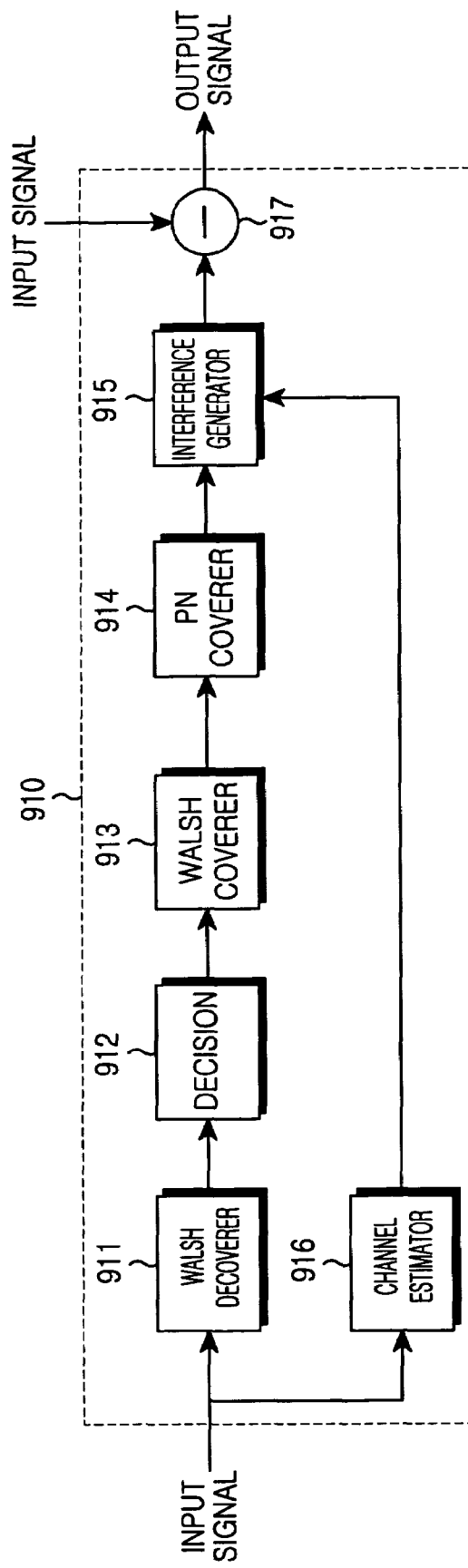
Figure 10A:
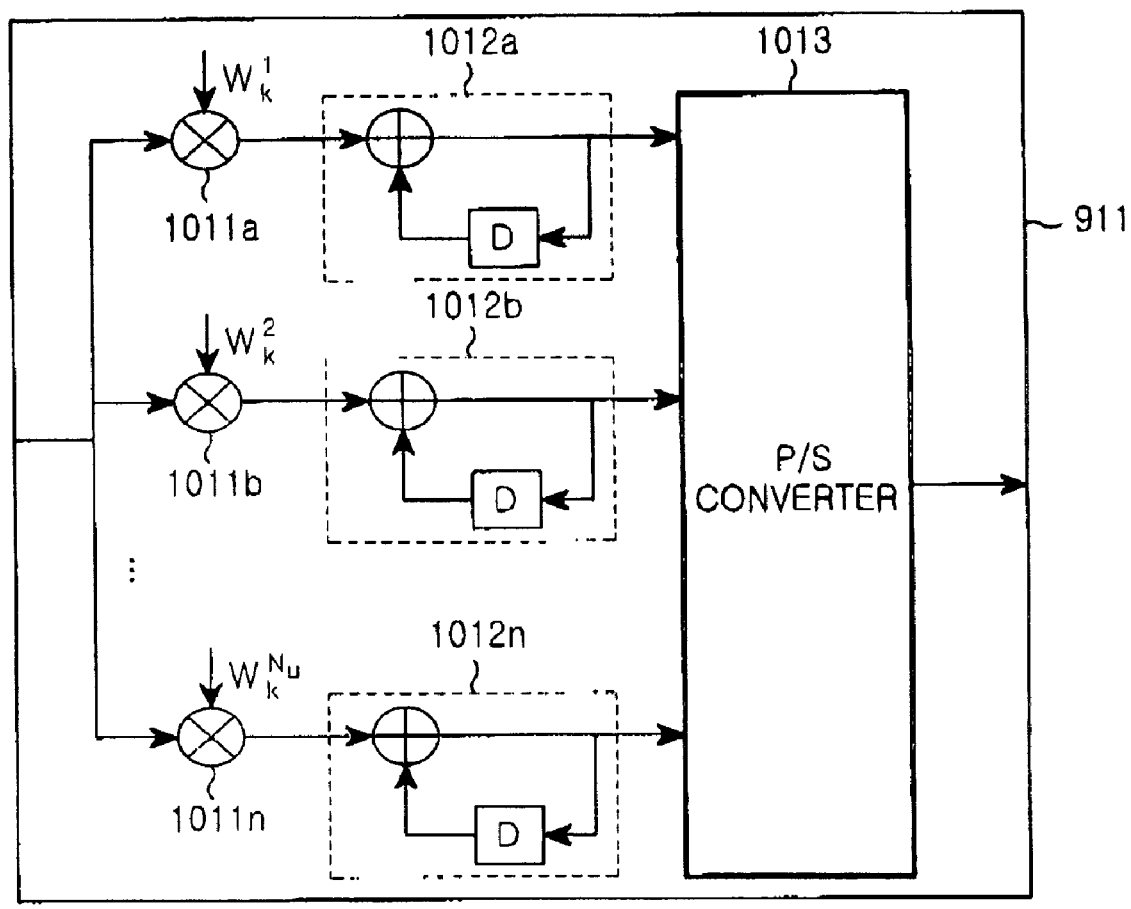
FIGS. 10A and 10B are block diagrams illustrating examples of a Walsh coverer and a Walsh decoverer both included in an interference canceller according to a first embodiment of the present invention.
Figure 10B:
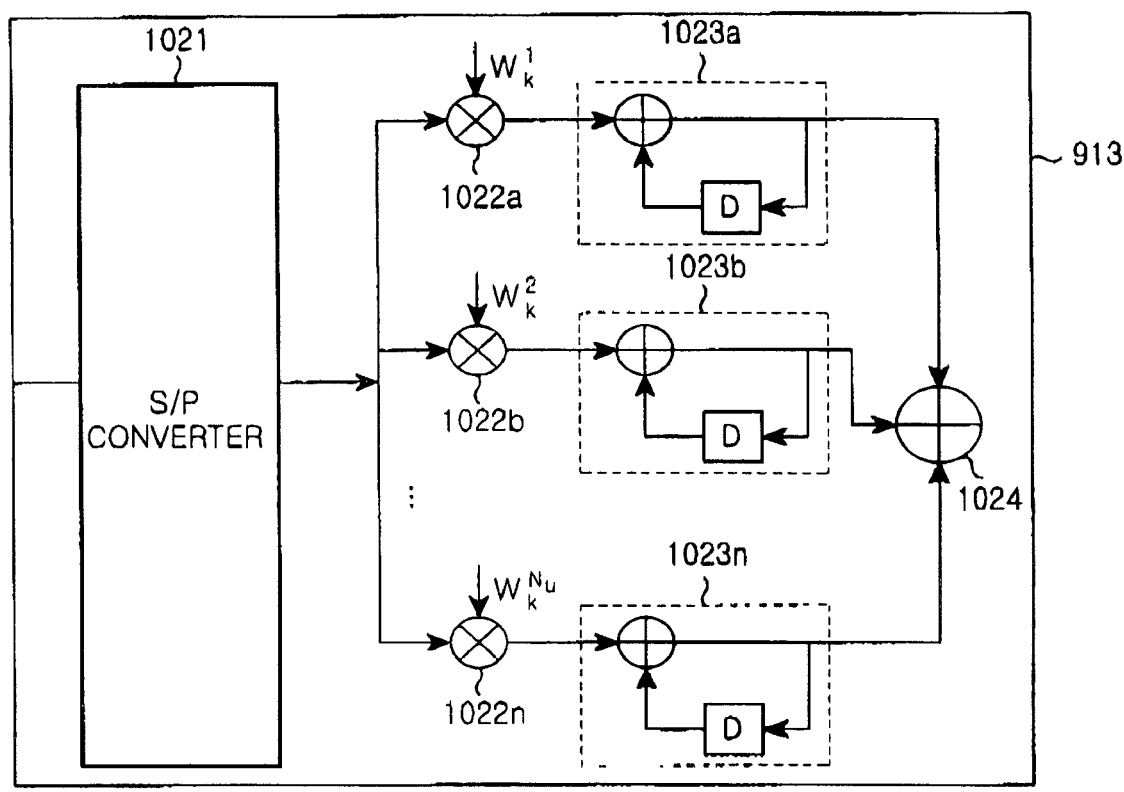

FIGS. 9A and 9B are block diagrams illustrating examples of an interference cancellation section for a high-speed packet data receiver and an interference canceller included in the interference cancellation section according to a first embodiment of the present invention. FIGS. 10A and 10B illustrate detailed structures of a Walsh coverer and a Walsh decoverer both included in an interference canceller according to an embodiment of the present invention.

Referring to FIGS. 9A and 9B, the interference cancellation section 807 for a high-speed packet data receiver comprises a plurality of interference cancellers 910a, 910b, . . . , 910n. Each interference canceller 910 includes a Walsh decoverer 911 for Walsh-decovering a unit of chip signal output from the buffer 806 into Walsh symbols, a decision block 912 for deciding the Walsh-decovered symbols, and a Walsh coverer 913 for Walsh-covering an output of the decision block 912. In addition, the interference canceller 910 includes a PN coverer 914 for PN-covering an output of the Walsh coverer 913, a channel estimator 916 for estimating a channel of a signal output from the buffer 806, an interference generator 915 for estimating an interference signal component by connecting the PN coverer 914 to the channel estimator 916, and a subtractor 917 for removing the estimated interference signal.

Referring to FIG. 10A, the Walsh decoverer 911 comprises multipliers 1011a, 1011b, . . . , 1011n for multiplying a unit of chip signal output from the buffer 806 by their unique Walsh codes, accumulators 1012a, 1012b, . . . , 1012n for accumulating outputs of the multipliers 1011a,

1011*b*, . . . , 1011*n* at stated periods, and a parallel-to-serial (P/S) converter 1013 for serial-converting the accumulated signals before transmission. Each accumulator 1012 comprises an adder connected to its associated multiplier 1011, and a delay D for delaying an output of the adder and then provides the delayed signal to the adder for accumulation.

Referring to FIG. 10B, the Walsh coverer 913 comprises a serial-to-parallel (S/P) converter 1021 for parallel-converting a signal output from the decision block 912, multipliers 1022*a*, 1022*b*, . . . , 1022*n* for multiplying the parallel-converted signals by their unique Walsh codes, accumulators 1023*a*, 1023*b*, . . . , 1023*n* for accumulating outputs of the multipliers 1022*a*, 1022*b*, . . . , 1022*n* at stated periods, and a summer 1024 for summing signals output from the accumulators 1023*a*, 1023*b*, . . . , 1023*n*. Each accumulator 1023 comprises an adder connected to its associated multiplier 1022, and a delay D for delaying an output of the adder and then provides the delayed signal to the adder for accumulation.

As described above, the embodiment of the present invention is focused on the interference cancellation controller 813 and the interference cancellation section 807, and is aimed at minimizing operation power by arranging and controlling the interference cancellation section according to a characteristic of a high-speed packet data channel and enabling the interference cancellation section only when necessary. Moreover, in the embodiment of the present invention, interference cancellation is performed at a following stage of the buffer, so that multipath signals are combined in a unit of chip signal in the finger section 801 and the unit of chip signals are converted into symbol signals in the Walsh decoverer 808. The embodiment of the present invention can be applied no matter which interference cancellation section is used, and can achieve its goal regardless of the type of the interference cancellation section used.

An interference cancellation operation performed in the high-speed packet data receiver having such a structure will now be described with reference to the accompanying drawings.

Figure 11:
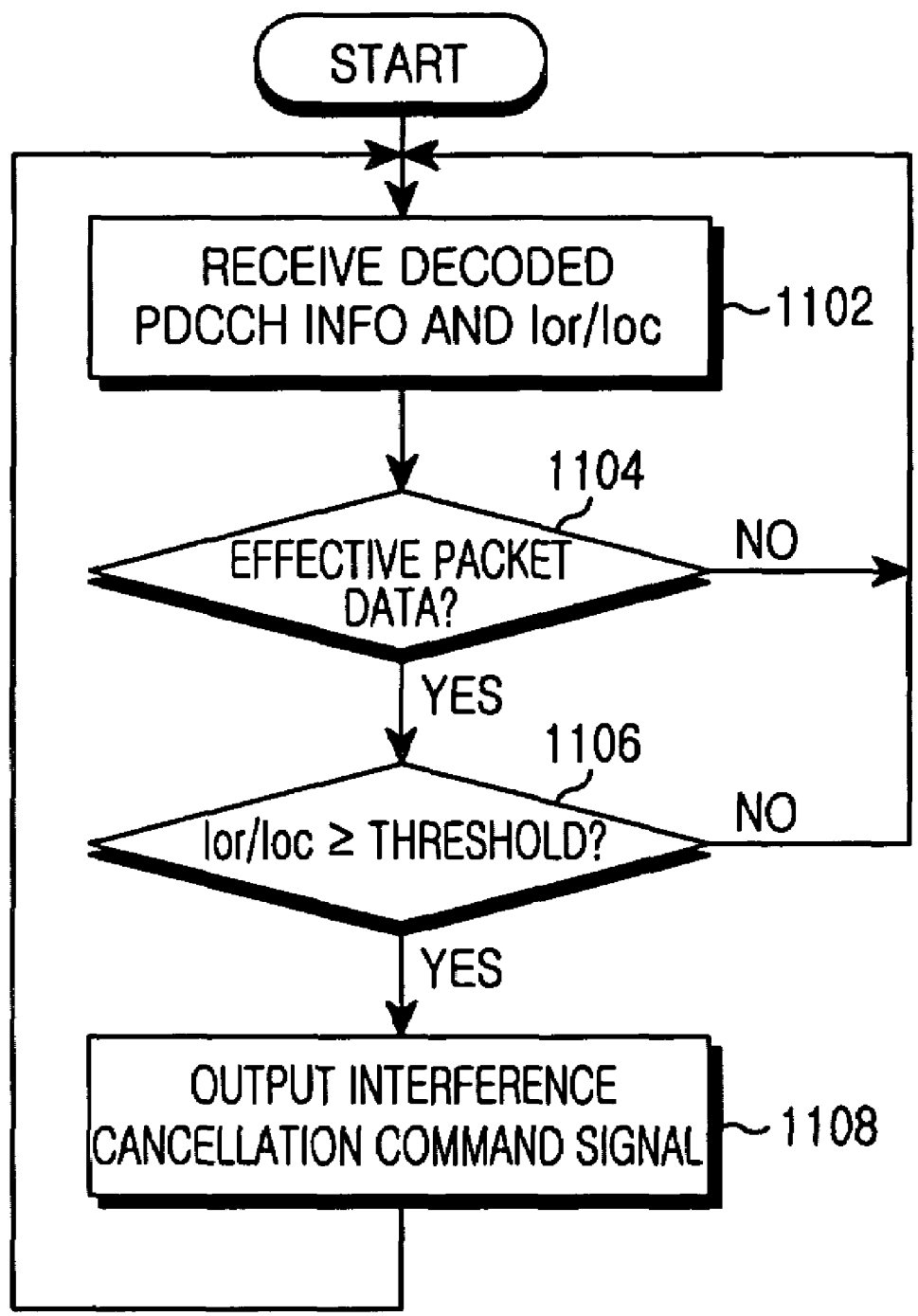
FIG. 11 is a flowchart illustrating an example of a control operation of an interference cancellation controller for a high-speed packet data receiver according to a first embodiment of the present invention.

FIG. 11 is a flowchart illustrating an example of a control operation of an interference cancellation controller for a high-speed packet data receiver according to a first embodiment of the present invention. In FIG. 11, a criterion for determining whether an interference cancellation operation is necessary or not includes determining the presence or absence of effective packet data and determining whether an Ior/Ioc value is higher than or equal to a predetermined threshold.

Referring to FIGS. 8 and 11, in step 1102, the interference cancellation controller 813 receives decoded PDCCH information output from the Viterbi decoder 804 and an Ior/Ioc value indicating a power ratio of signals from a desired base station to signals from other base stations, and then proceeds to step 1104. In step 1104, the interference cancellation controller 813 determines whether there is effective packet data being received at the current time slot, based on the decoded PDCCH information. If no effective packet data exists, the interference cancellation controller 813 returns to step 1102. Otherwise, if effective packet data exists, the interference cancellation controller 813 proceeds to step 1106. In step 1106, the interference cancellation controller 813 determines whether the Ior/Ioc value is higher than or equal to a predetermined threshold that is uniquely set for a particular modulation scheme. If the Ior/Ioc value is lower than the threshold, the interference cancellation controller 813 returns to step 1102. Otherwise, if the Ior/Ioc value is higher than or equal to the threshold, the interference cancellation controller 813 proceeds to step 1108. Here, the threshold can be appropriately set to an Ior/Ioc value where a gain obtained by canceling a multipath interference signal becomes negligible. In other words, "the Ior/Ioc value is lower than the threshold" refers to signals received from other base stations are relatively too high in power compared to multipath interference signals, so that a gain obtained by removing the multipath interference signals becomes negligible. In step 1108, the interference cancellation controller 813 generates an interference cancellation command signal and provides the generated interference cancellation command signal to the interference cancellation section 807. By repeating the above procedure, the interference cancellation controller 813 can enable the interference cancellation section 807 when necessary.

An operation of the interference cancellation section 807 after receiving the interference cancellation command signal from the interference cancellation controller 813 will now be described with reference to the accompanying drawings.

Figure 12:
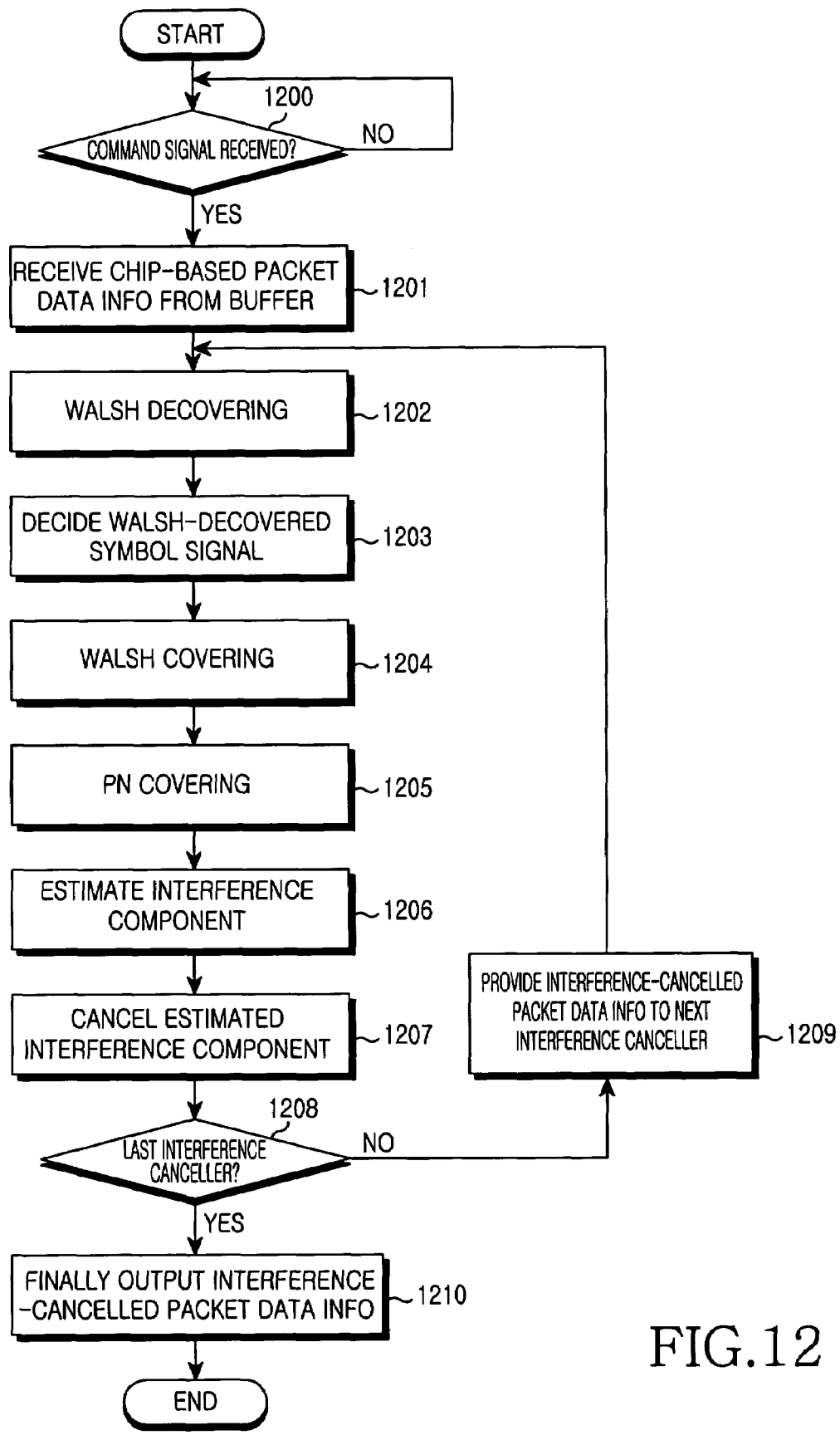
FIG. 12 is a flowchart illustrating an example of a procedure for removing interference signals by an interference cancellation section according to a first embodiment of the present invention.

FIG. 12 is a flowchart illustrating an example of a procedure for removing interference signals by an interference cancellation section according to a first embodiment of the present invention. In step 1200, the interference cancellation section 807 determines whether a command signal is received from the interference cancellation controller 813. If no command signal is received, the interference cancellation section 807 waits for a command signal. However, if a command signal is received, the interference cancellation section 807 receives a unit of signal, i.e., packet data information, from the buffer 806 at the first interference canceller 910*a* in the interference cancellation section 807, in step 1201.

The interference cancellation section 807 generates a Walsh symbol signal by performing Walsh decovering on the received a unit of signal through the Walsh decoverer 911 in step 1202, and then determines one of transmission levels for the Walsh symbol signal through the decision block 912 in step 1203.

In step 1204, the interference cancellation section 807 Walsh-covers the Walsh symbol signal with a corresponding Walsh code through the Walsh coverer 913. In step 1205, the interference cancellation section 807 multiplies the Walsh-covered signal by a PN code through the PN coverer 914 to convert the signal into its original signal format, and then provides its output to the interference generator 915. Here, since a signal input to the decision block 912 includes a noise component, the input signal is not correctly identical to a transmitted signal and may include errors. In this process, the channel estimator 916 in the first interference canceller 910*a* channel-estimates a unit of signal output from the buffer 806 and provides the estimation result to the interference generator 915.

In step 1206, the interference cancellation section 807 estimates an interference signal component included in an actual signal using a signal converted from the PN coverer 914 through the interference generator 915 and channel estimation result information received from the channel estimator 916. In step 1207, the interference cancellation section 807 cancels the estimated interference signal component through the subtractor 917.

Thereafter, in step 1208, the interference cancellation section 807 determines whether the current interference canceller is the last interference canceller 910*n*. As a result of the determination, if the current interference canceller is not the last interference canceller 910*n*, the interference cancellation section 807 applies the interference-cancelled packet data information to a second interference canceller 910b in step 1209, and then returns to step 1202. Otherwise, if the current interference canceller is the last interference canceller 910n, the interference cancellation section 807 finally outputs interference-cancelled packet data information in step 1210. The process of steps 1202 to 1207 is repeatedly applied to the succeeding interference cancellers to precisely cancel the interference signal through several interference cancellation operations. Such an interference cancellation operation can be expressed as $$\hat{I}_k^{(1)} = \sum_{m=1}^{L} (\hat{\alpha}^{(m)})^* \cdot \left( \sum_{l=1}^{L} \alpha^{(l)} \cdot I_{k-k_l} + n_k \right)$$

$$= \left( \sum_{m=1}^{L} ((\hat{\alpha}^{(m)})^* \alpha^{(m)}) \right) \cdot I_k + \sum_{m=1}^{L} \sum_{l \neq m}^{L} ((\hat{\alpha}^{(m)})^* \cdot \alpha^{(l)}) \cdot I_{k-k_l} + n'_k$$

$$= A \cdot I_k \sum_{l=1}^{L(L-1)} h_l \cdot I_{k-k_l} + n'_k$$

Equation (1)

In Equation (1), a first term represents a transmission signal multiplied by a channel gain, a second term represents an interference signal in a multipath signal, and a third term represents a noise component. Equation (1) shows an interference cancellation method in which the conventional interference signal is cancelled at the finger section 801. It can be seen that since combined multipath signal rather than interference signals from respective fingers is regarded as an original signal, a unit of-based interference signal is included in the original signal. In addition, if $I_k$ and an interference signal pattern $h_1$ can be estimated, the second term can be removed from Equation (1).

Estimation of the $I_k$ can be performed by deciding a level of a transmitted signal through the Walsh decoverer 911 and the decision block 912 and then performing a reverse process, and the estimation is performed in the Walsh decoverer 911. Channel estimation on the $h_1$ is performed in the channel estimator 916.

Figure 13:
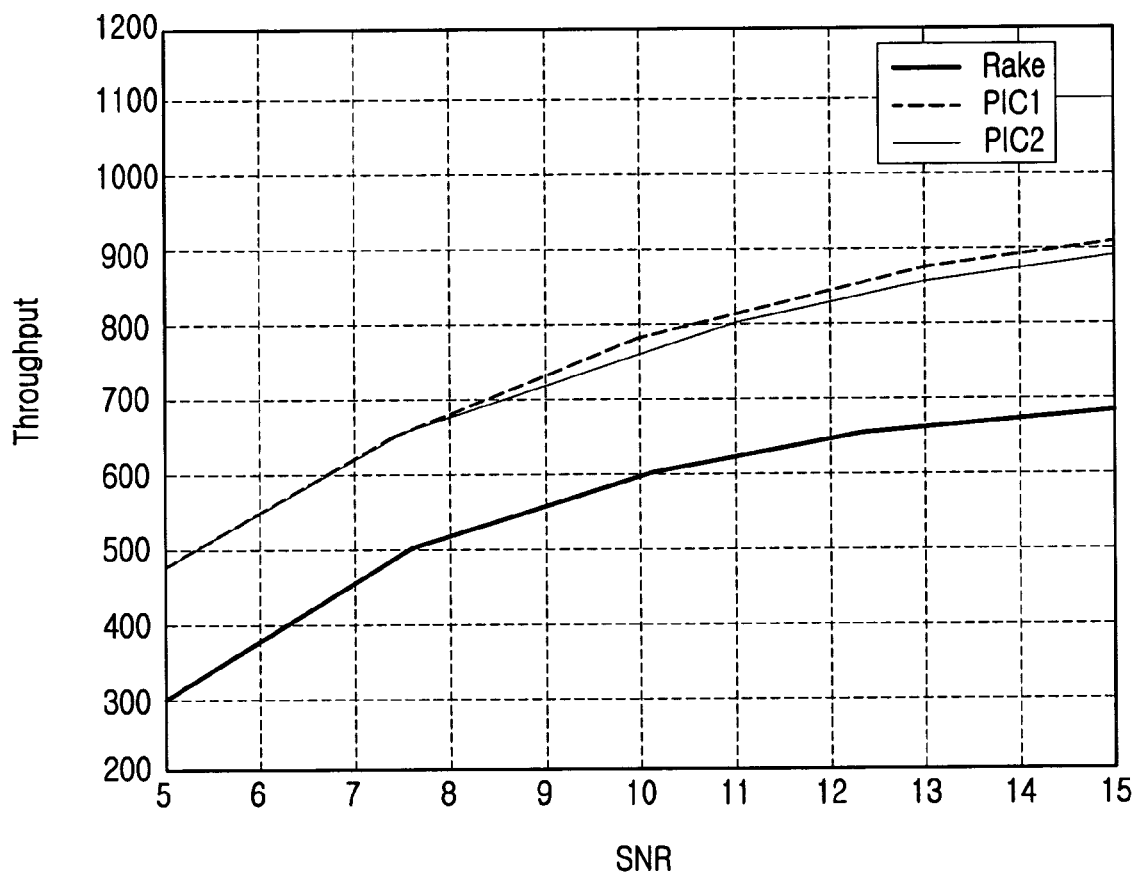
FIG. 13 is a graph illustrating an example of improvement of a data rate according to a first embodiment of the present invention.

An example of a data rate improved through such an interference cancellation operation is illustrated in FIG. 13. A graph of FIG. 13 shows an improved amount of data that one user can transmit when the embodiments of the present invention are applied. Here, a curve represented by "Rake" shows a case where the conventional rake receiver is used, and curves represented by PIC1 and PIC2 show a case where only the first interference canceller is used and a case where only the second interference canceller is used, respectively.

As described above, the first embodiment of the present invention provides an interference cancellation apparatus and method in which a channel estimator is included in each of interference cancellers. However, the following second embodiment of the present invention provides an interference cancellation apparatus and method in which only one channel estimator is included in the interference cancellation section.

Figure 14:
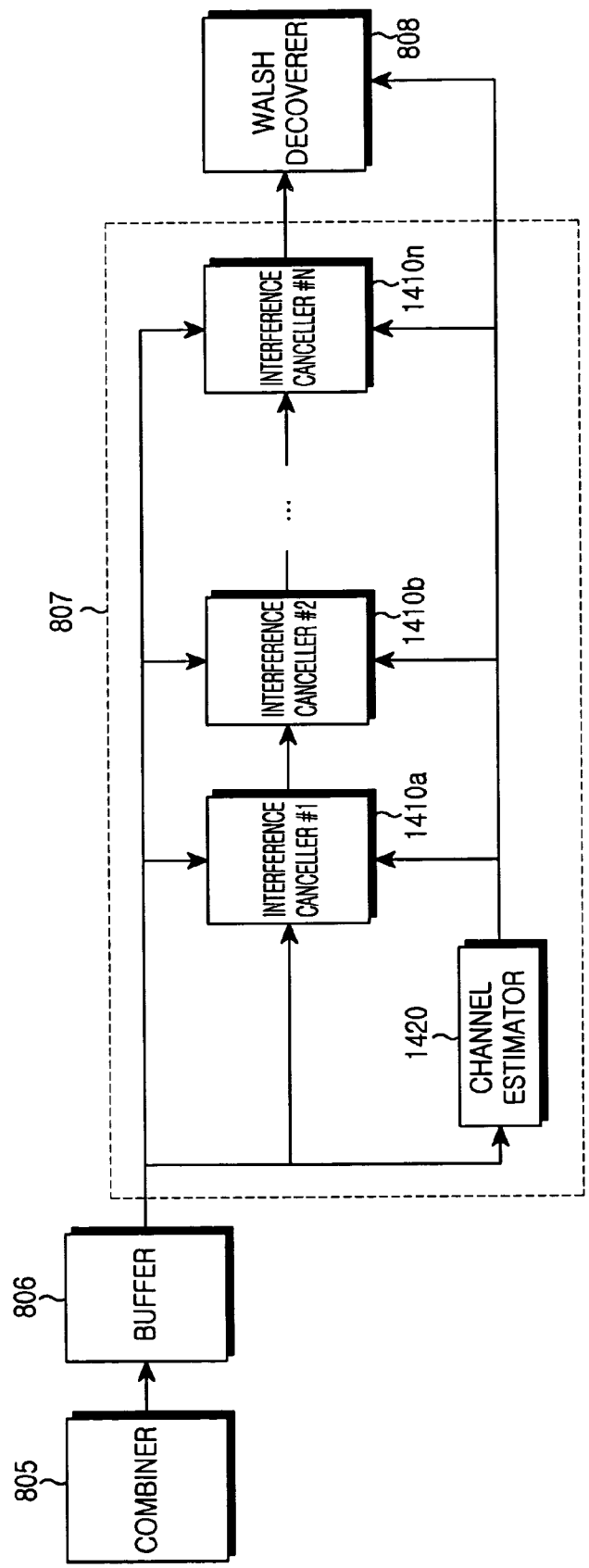
FIG. 14 is a block diagram illustrating an example of an interference cancellation section for a high-speed packet data receiver according to a second embodiment of the present invention.

FIG. 14 is a block diagram illustrating an example of an interference cancellation section for a high-speed packet data receiver according to a second embodiment of the present invention.

Referring to FIGS. 8 and 14, the interference cancellation section 807 comprises a plurality of interference cancellers 1410a, 1410b, . . . , 1014n, and a channel estimator 1420 for estimating a channel from a unit of chip signal output from the buffer 806 and transmitting the estimation result to the interference cancellers 1410a, 1410b, . . . , 1014n.

Each of the interference cancellers 1410a, 1410b, . . . , 1014n receives a unit of chip signal output from the buffer 806 and channel estimation information output from the channel estimator 1420. Here, the interference cancellers 1410a, 1410b, . . . , 1014n excluding the channel estimator 1420 are identical in structure to the interference canceller 910 according to the first embodiment of the present invention.

The channel estimator 1420 estimates a packet data channel by receiving a signal output from the combiner 805 and the buffer 806, and provides the estimation result to the interference cancellation section 807 and the Walsh decoverer 808. The channel estimator 1420 is implemented in such a manner that a pilot signal passes through a Finite Impulse Response (FIR) or Infinite Impulse Response (IIR) filter, and the channel estimator 1420 estimates $h_n$ using channel information $\alpha^{(m)}$ which is estimated using a pilot signal by a channel estimator (not shown) included in each finger 801. It should be noted that the channel estimation can also be performed by software in a central processing unit.

An interference cancellation section having such a structure can reduce its hardware complexity by using a single channel estimator. A packet data receiver including such an interference cancellation section is identical to the first embodiment of the present invention, and the interference cancellation section cancels an interference signal in response to a command signal from the interference cancellation controller.

As described above, the first and second embodiments of the present invention provide an interference cancellation apparatus and method including a plurality of interference cancellers having devices for estimating a reference level signal necessary for decision of a multilevel signal. However, the following third embodiment of the present invention provides an interference cancellation apparatus and method including interference cancellers having a structure excluding decision devices from the interference cancellers in order to reduce hardware complexity.

Figure 15:
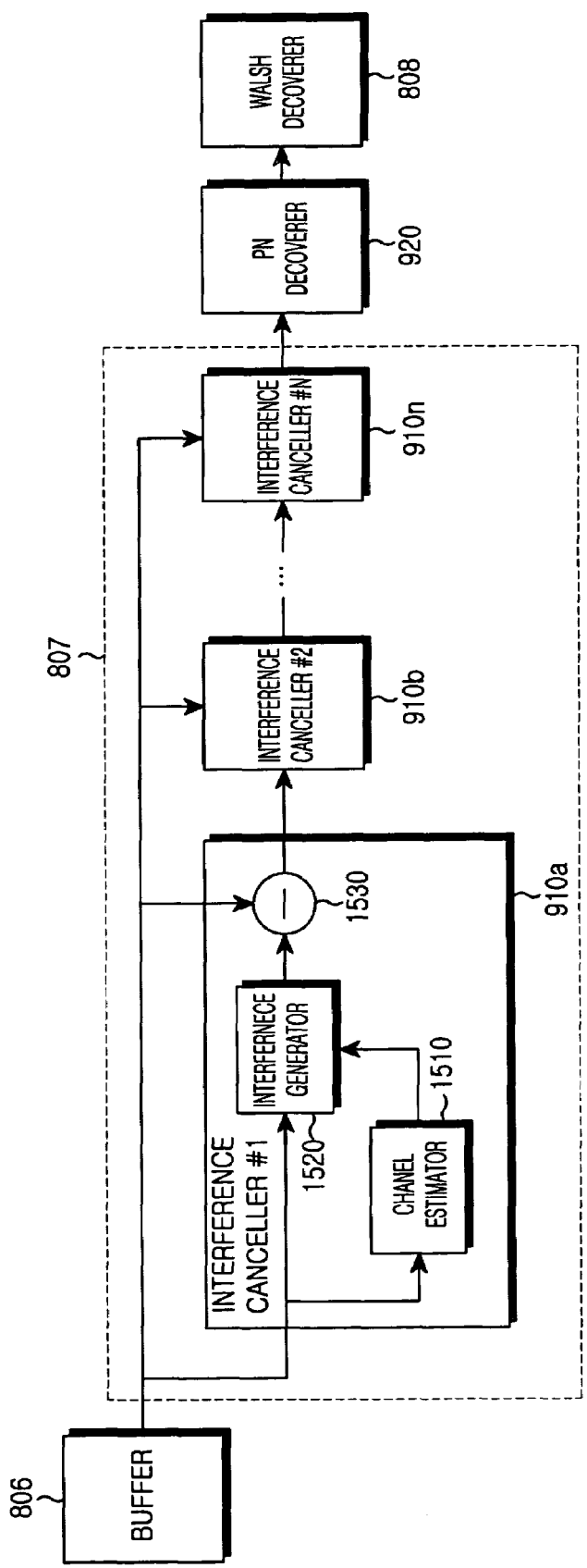
FIG. 15 is a block diagram illustrating an example of an interference cancellation section for a high-speed packet data receiver according to a third embodiment of the present invention.

FIG. 15 is a block diagram illustrating an example of an interference cancellation section for a high-speed packet data receiver according to a third embodiment of the present invention.

Referring to FIGS. 9A and 15, the interference cancellation section 807 includes a plurality of interference cancellers 910a, 910b, . . . , 910n. Each of the interference cancellers 910a, 910b, . . . , 910n comprises a channel estimator 1510 for estimating a channel from an output signal of the buffer 806, an interference generator 1520 for receiving information on the estimated channel and estimating an interference signal from a unit of chip signal output from the buffer 806, and a subtractor 1530 for removing the estimated interference signal.

An operation of the interference cancellation section having such a structure is substantially identical to an operation of the first embodiment of the present invention except for a decision operation in each interference canceller, so a detailed description thereof will be omitted. In addition, an operation of the packet data receiver including the interference cancellation section is substantially equal to that of the first embodiment of the present invention, and the interference cancellation section cancels an interference signal in response to a command signal from the interference cancellation controller.

As can be understood from the forgoing description, the invention provides a method for arranging an interference cancellation section in a following stage of a PDCH decode buffer in a receiver for a packet data communication system, first decoding a packet data control channel (PDCCH), and then optionally enabling the interference canceller according to the decode result of the PDCCH and its channel condition.

In this manner, the new interference cancellation method can reduce power consumption of a mobile station as compared with the conventional interference cancellation method.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A signal reception apparatus in a packet data communication system transmitting and receiving a packet data channel and a packet data control channel, the apparatus comprising:
   a finger for processing a multipath signal received over the packet data channel and the packet data control channel, and outputting the processed packet data channel signal and the processed packet data control channel signal;
   a combiner for combining the packet data channel signal outputted from the finger in a unit of chip;
   an interference cancellation section for canceling an interference signal from the combined packet data channel signal;
   a decoder for decoding an output signal of the interference cancellation section; and
   an interference cancellation controller for analyzing information obtained by decoding the packet data control channel and outputting an interference cancellation command signal to the interference cancellation section only when it is determined that effective packet data to be received exists in a current time slot.

2. The signal reception apparatus of claim 1, further comprising a buffer for storing the packet data channel signal outputted from the combiner.

3. The signal reception apparatus of claim 1, wherein the interference cancellation section is located between the finger and the decoder.

4. The signal reception apparatus of claim 1, further comprising the interference cancellation controller for outputting the interference cancellation command signal according to a used modulation scheme in the packet data control channel information obtained by decoding the packet data control channel to the interference cancellation section, when it is determined that the effective packet data exists in the current time slot.

5. The signal reception apparatus of claim 1, further comprising the interference cancellation controller for receiving a power ratio of signals from a desired base station to signals from other base stations, when it is determined that the effective packet data exists in the current time slot and outputting the interference cancellation command signal to the interference cancellation section only when the power ratio is higher than or equal to a predetermined threshold that is uniquely set according to a used modulation scheme.

6. The signal reception apparatus of claim 1, further comprising the interference cancellation controller for outputting the interference cancellation command signal to the interference cancellation section only when the effective packet data exists in the current time slot and a code rate of a channel coder used in a transmitter is higher than or equal to a predetermined threshold.

7. The signal reception apparatus of claim 1, wherein the decoder comprises:
   a Walsh decover for Walsh-decovering the output of interference canceller;
   a metric generator for generating metrics from the output of the Walsh decover;
   a deinterleaver for deinterleaving the output of the metric generator; and
   a turbo decoder for turbo-decoding the output of the deinterleaver.

8. A method for canceling an interference signal in receiver for a packet data communication system in which data is transmitted and received over a packet data channel and a packet data control channel, the method comprising the steps of:
   processing a multipath signal received over the packet data channel and the packet data control channel, and outputting the processed packet data channel signal and the processed packet data control channel signal;
   combining the processed packet data channel signal in a unit of chip;
   reading the combined packet data channel signal and canceling an interference signal from the read packet data channel signal;
   decoding the interference-cancelled packet data channel signal; and
   analyzing information obtained by decoding the packet data control channel and outputting an interference cancellation command signal only when it is determined that effective packet data to be received exists in a current time slot.

9. The method of claim 8, further comprising the step of storing the combined packet data channel signal.

10. The method of claim 8, wherein the step of outputting an interference cancellation command signal comprises the step of outputting the interference cancellation command signal according to a used modulation scheme in the packet data control channel information obtained by decoding the packet data control channel, when it is determined that the effective packet data exists in the current time slot.

11. The method of claim 8, wherein the step of outputting an interference cancellation command signal comprises the steps of:
   receiving a power ratio of signals from a desired base station to signals from other base stations, when it is determined that the effective packet data exists in the current time slot; and
   outputting the interference cancellation command signal only when the power ratio is higher than or equal to a predetermined threshold that is uniquely set according to the modulation scheme used.

12. The method of claim 8, wherein the step of outputting an interference cancellation command signal comprises the step of outputting the interference cancellation command signal only when the effective packet data exists in the current time slot and a code rate of a channel coder used in a transmitter is higher than or equal to a predetermined threshold.

13. The method of claim 8, wherein the step of decoding the interference-cancelled packet data channel signal comprises the steps of:
   Walsh-decovering the interference-cancelled packet data channel signal;
   generating metrics from the output of the Walsh-decovered signal;
   deinterleavering the metrics; and
   turbo-decoding the interference-cancelled packet data channel signal using the deinterleaved metrics.

* * * * *